Nov. 26, 1957 E. GOLDSTEIN ET AL 2,814,267
DRINK INDICATING DEVICE
Filed March 5, 1956
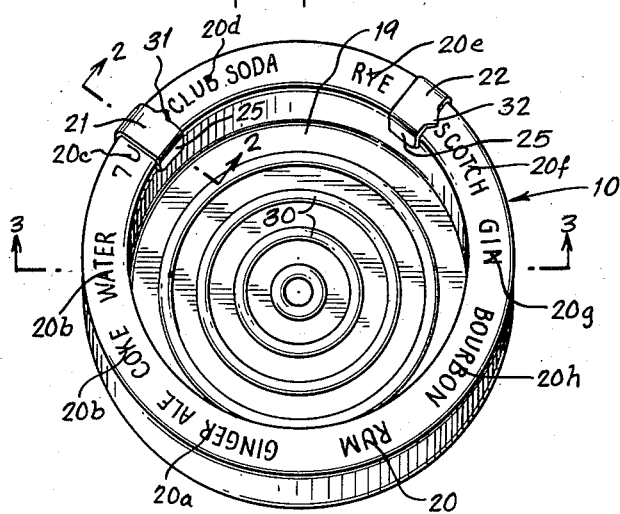
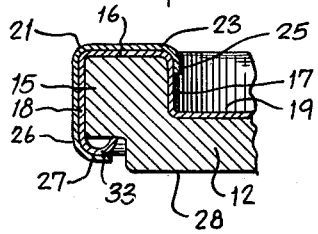
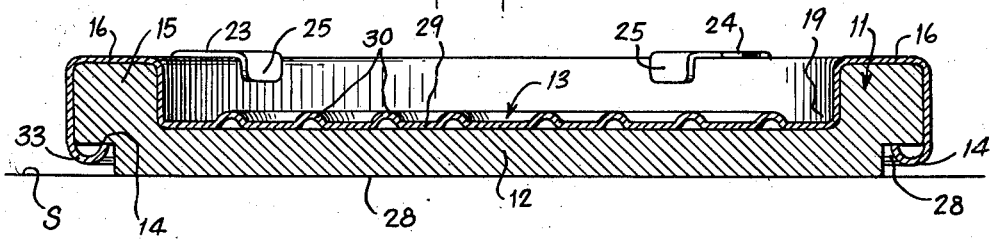
INVENTOR.
EDWIN GOLDSTEIN &
EMIL A. NOVY
BY
ATTORNEY United States Patent Office 2,814,267
Patented Nov. 26, 1957

2,814,267
DRINK INDICATING DEVICE

Edwin Goldstein, West Orange, and Emil A. Novy, Westfield, N. J.

Application March 5, 1956, Serial No. 569,450

2 Claims. (Cl. 116—133)

This invention relates to a drink indicating device adapted to "silently" and accurately indicate the drink preference of the user. It consists of a device for reception of a glass, having an upstanding rim on which indicia are marked noting drinks and mixers therefor. By use of the device, one may accurately note the precise drink and combination desired, and the probability of mistakes in either filling orders or routing them respectively to the proper persons ordering the same, may be eliminated.

The device of this invention includes novel structural features and advantages more particularly described below and illustrated in the drawings, wherein:

Fig. 1 is a perspective view of a drink indicating device embodying the invention, Fig. 2 is an enlarged fragmentary, vertical sectional view thereof, taken on line 2—2 of Fig. 1, and Fig. 3 is an enlarged transverse sectional view, taken on line 3—3 of Fig. 1.

As shown in the drawings, the device 10 of this invention comprises a base member 11, which may be made of a single piece of suitable material such as plastics, metal, or a combination thereof or may be fabricated of two or more pieces, including as shown in Figs. 2 and 3, a portion 12 of relatively soft or non-scratching material, such as cork or the like, which may have an outer facing 13 marginally or otherwise, secured thereto as at 14, the other facing 13 might be made of metal or other hard material and might be made of several parts, if so desired. The term "base member" as used herein shall be deemed to comprehend and include the various forms of base member mentioned herein and others suggested thereby, made of one or more parts.

The base member 11 is provided with upstanding rim 15 having a flat upper wall 16 and inner and outer walls 17, 18 (Fig. 2) depending therefrom in spaced relation. The inner wall and base member define a well 19 for the reception of the glass. Indicia is provided at spaced points on the upper wall of the base as indicated by the reference characters 20—20h (Fig. 1) and one or more slide members 21, 22 are provided having flat portions 23, 24 (Fig. 3) to slidably engage the flat upper wall of the base member rim. The slide members may be provided with means for engaging the base member rim to prevent displacement, such as depending spaced fingers 25, 26 (Fig. 2) engaging the side walls 17, 18 of the base member rim; one of said fingers may terminate in a lip portion 27 to engage an inwardly recessed portion 33 connecting the flat lower face 28 of base member 11 with the rim portion 15 thereof. The base member may have a flat upper face 29, with ribs 30 formed thereon on which the glass may be positioned.

In use, the device would be placed on the surface S, such as a table or the like, and the user would move the slide members 21, 22 into registry with the specific indicia denoting the drink desired by him. Thus, for example, as shown in Fig. 1, the slide members 21, 22 indicate that the drink desired is scotch and club soda. Not only will the device facilitate the filling of orders more precisely, but it will also make the giving of orders a simpler procedure, eliminating the necessity for spoken orders or requests. The slide members 21, 22 may be provided with marking pointers 31, 32 (Fig. 1) if desired.

Having thus described my invention, what we claim as new and desire to secure by Letters Patent is:

1. A drink indicating device comprising a flat base member, an upstanding rim on said base member, said rim having a flat upper wall and inner and outer side walls depending therefrom in spaced relation, the inner wall and base member defining a well for reception of a glass, indicia on said upper wall at spaced points therealong for noting preference for different drinks an inwardly recessed portion connecting the base member in rim portion thereof, and a slide member having a portion to slidably engage the flat upper wall of the base member rim, for registration with drink indicia thereon, and means on the slide member engaging a side wall of the base member rim comprising depending spaced fingers to engage the side walls of the rim and a lip portion on one of said fingers to engage said recessed portion of the base member.

2. A drink indicating device having a flat base member, a plurality of angularly connected flat walls defining an upstanding rim on said base member, indicia on one of said walls at spaced points therealong designating different drinks, and a slide member formed of a cross section corresponding with that of the cross section of the rim and proportioned to slidably engage the rim for sliding therealong and registration with drink indicia thereon, said slide member, by virtue of the said cross sectional configuration, being keyed to the rim against displacement therefrom.

References Cited in the file of this patent

UNITED STATES PATENTS 2,593,868    Fowler _____ Apr. 22, 1952

FOREIGN PATENTS 370,270    Germany _____ Mar. 1, 1923
347,713    Great Britain _____ May 1, 1931